US007522677B2

(12) United States Patent
Liang

(10) Patent No.: US 7,522,677 B2
(45) Date of Patent: Apr. 21, 2009

(54) RECEIVER WITH LOW POWER LISTEN MODE IN A WIRELESS LOCAL AREA NETWORK

(75) Inventor: Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 738 days.

(21) Appl. No.: 10/690,446

(22) Filed: Oct. 21, 2003

(65) Prior Publication Data
US 2005/0084037 A1    Apr. 21, 2005

(51) Int. Cl.
*H04L 27/06* (2006.01)
(52) U.S. Cl. ...................................... 375/316
(58) Field of Classification Search ................. 375/316, 375/354, 216, 217, 144, 147, 148, 224, 340, 375/341, 349, 343; 455/13.4, 574, 456.4, 455/522, 212, 218; 370/338
See application file for complete search history.

(56) References Cited

U.S. PATENT DOCUMENTS

| 5,606,313 | A  | * | 2/1997  | Allen et al. ............. 340/10.31 |
| 5,881,101 | A  | * | 3/1999  | Furman et al. .............. 375/217 |
| 6,738,439 | B1 | * | 5/2004  | Okanoue et al. ............ 375/347 |
| 6,928,103 | B2 | * | 8/2005  | Imaizumi et al. ............ 375/142 |
| 6,985,511 | B2 | * | 1/2006  | Kanterakis et al. .......... 375/141 |
| 7,145,862 | B2 | * | 12/2006 | Batariere et al. ............ 370/203 |
| 7,200,164 | B2 | * | 4/2007  | Chen et al. ................. 375/148 |
| 7,277,432 | B2 | * | 10/2007 | Liang et al. ................. 370/389 |
| 2001/0043751 | A1 | * | 11/2001 | Takahashi et al. ........... 382/240 |
| 2003/0216154 | A1 | * | 11/2003 | Mennenga et al. .......... 455/561 |
| 2004/0022225 | A1 | * | 2/2004  | Liang et al. ................. 370/338 |
| 2004/0266493 | A1 | * | 12/2004 | Bahl et al. .................. 455/574 |
| 2005/0074036 | A1 | * | 4/2005  | Gorday et al. .............. 370/513 |

FOREIGN PATENT DOCUMENTS

WO        WO 02/082121        * 10/2002

OTHER PUBLICATIONS

Pawlowski, Stephen S., "CMOS Radio Expanding Moore's Law With Ubiquitous Silicon-Based Wireless Connectivity," Intel, Apr. 2002, 4 pages.
Zyren, Jim and Perick, Al, "Brief Tutorial On IEEE 802.11 Wireless LANs," Intersil, Feb. 1999, Application Note 9829, pp. 1-7.

* cited by examiner

*Primary Examiner*—Young T. Tse
(74) *Attorney, Agent, or Firm*—Steven A. Shaw; W. James Brady; Frederick J. Telecky, Jr.

(57) ABSTRACT

A receiver for a wireless local area network, WLAN, having a low power listening mode of operation. The receiver includes two separate paths in the analog front end, AFE. One path includes a low resolution and low power analog to digital converter, ADC. The other path includes a high resolution and high power ADC. In listen mode, only the low resolution ADC is powered and provides inputs to a packet detector for identifying a barker code. When the correct barker code is received, the high resolution ADC is enabled and coupled to a receiver for receiving a payload in the data packet.

17 Claims, 1 Drawing Sheet

RECEIVER WITH LOW POWER LISTEN MODE IN A WIRELESS LOCAL AREA NETWORK

BACKGROUND

1. Field of the Invention

The present invention generally relates to communication systems. More particularly, the invention generally relates to wireless local area networks (WLAN) and more particularly still to a receiver having a low power listen mode for use in a WLAN.

2. Background Information

Initially, computers were most often used in a standalone manner. It is now commonplace for computers and other types of electronic devices to communicate with each other over networks. The ability for computers to communicate with one another has lead to the creation of small networks comprising two or three computers as well as vast networks comprising hundreds or even thousands of computers. Networks can be set up to provide a wide assortment of capabilities. For example, networked computers can be established to permit each computer to share a centralized mass storage device or printer. Further, networks enable electronic mail and numerous other types of services. Traditionally, networks have been established in a wired configuration in which each entity on the network has a direct physical electrical connection to the network. More recently, advances in wireless technology have made it possible for network devices to communicate with other devices via radio frequency (RF) or other types of wireless media.

Wireless networks are defined in various standards. The IEEE 802.11 standard, for example, permits a wireless local area network (WLAN) to be set up in a business or residence. In one form, the WLAN is a basic service set in which two or more stations communicate directly with each other, e.g. by radio frequency signals. In a more common configuration, one or more "access points" are set up at predetermined locations and are connected via cables to servers and other types of network equipment. Each access point also has a wireless radio capability to permit wireless communications with nearby wireless-enabled devices such as desktop computers, notebooks, handheld devices, and the like. Each access point has a certain range and a wireless-enabled device must be within that range for effective communications to occur. Through the access points, the wireless-enabled devices gain access to the network for data and file transfers, email, etc. The access points and wireless enabled stations have transmitters and receivers to perform the wireless communications.

One of the significant benefits of wireless networking is that the network devices can be mobile. Accordingly, most of the devices coupling to a wireless network are portable devices such as notebook computers, personal digital assistants (PDAs), and the like. Such portable devices are usually battery-powered. In battery-powered devices, power consumption is a significant issue since increased power consumption generally means shorter battery life for the device. Accordingly, reducing power consumption for such devices is desirable.

BRIEF SUMMARY

A receiver with low-power listen mode for use in a wireless network station is disclosed. The receiver includes a low power path used in listen mode and a high power path which is used only when a data payload is being received.

An embodiment includes two analog to digital converters, ADCs, in the analog front end of the receiver. One ADC has low resolution, and therefore low power consumption, and is enabled during listen mode. The other ADC has high resolution, and is only enabled when a packet detector detects an incoming message for the station.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Unless otherwise specified, the embodiments disclosed should not be interpreted as limiting, or otherwise used to limit, the scope of the disclosure or claims. In addition, one skilled in the art will understand that the following description has broad application. The discussion of any embodiment is meant only to be exemplary of that embodiment and is not intended to suggest that the scope of the disclosure or claims is limited to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. Further, all functions described herein may be performed in either hardware or software, or a combination thereof, unless indicated otherwise.

Figure 1:
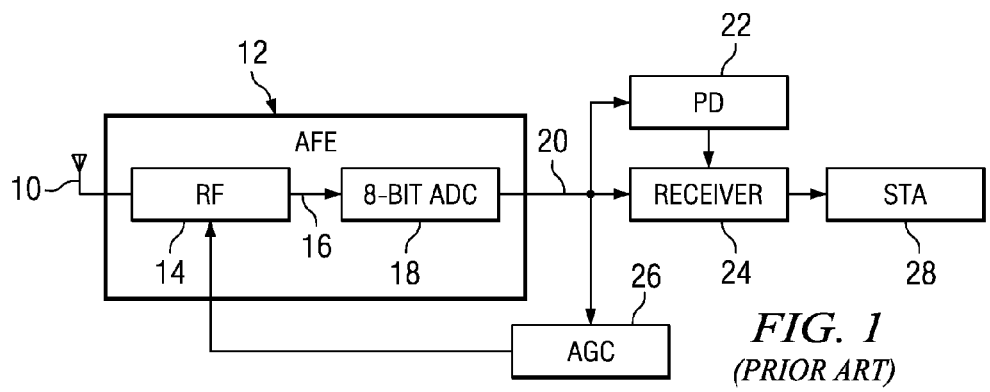
FIG. 1 illustrates a prior art receiver in a wireless communication system.

Referring now to FIG. 1, there is illustrated the basic components of a prior art WLAN receiver designed to operate under the IEEE 802.11 standard. Radio frequency, RF, signals are received by an antenna 10. An analog front end, AFE, 12 includes a RF section 14 typically including a low noise amplifier connected to the antenna 10, a mixer for converting the RF signal to baseband, and a baseband amplifier. A baseband signal is typically coupled on a line 16 to an analog to digital converter, ADC, 18. The digitized baseband signal is then provided on output 20 of the AFE 12. The output 20 is coupled to a packet detector 22, a receiver 24, and an automatic gain control, AGC, 26. The AGC 26 provides a feedback signal to the RF section 14 to maintain the level of output 20 within a desired range.

The packet detector 22 continuously monitors the received RF signals to detect a code which indicates that a data packet is being sent to the station 28 to which receiver 24 is coupled. A typical code is a barker code, which is a well-known spread spectrum code which uses a pseudo-random numerical sequence. A barker code is found in the beginning or preamble of every valid data packet. When the correct code is detected by the packet detector 22, it provides signals to the receiver 24 indicating that there is an incoming message and provides timing signals needed to decode the data, which is normally encrypted.

In the conventional system of FIG. 1, the AFE 12 includes a conventional high resolution ADC 18. In this example, the ADC 18 has eight bits of resolution, but in some systems, resolutions of nine bits or more may be used. The resolution of the ADC 18 is selected to provide a sufficient resolution to the input of the receiver 24, which must accurately decode and/or decrypt the incoming data or payload. In the conventional system, the output 20 is also the input to the packet detector 22. Therefore, the entire AFE 12, including the ADC 18 must remain powered up at all times listening for possible incoming signals. The high resolution ADC 18 uses a considerable amount of power and is therefore responsible for shortening the time in which battery power can keep station 28 operating.

As noted above, the standard packet detector 22 is designed to detect a spread spectrum barker code. The typical barker code is eleven bits long. Detection is performed by cross correlating the known barker code with the incoming signals. When the proper code is received, the correlator produces an easily recognized spike.

Figure 2:
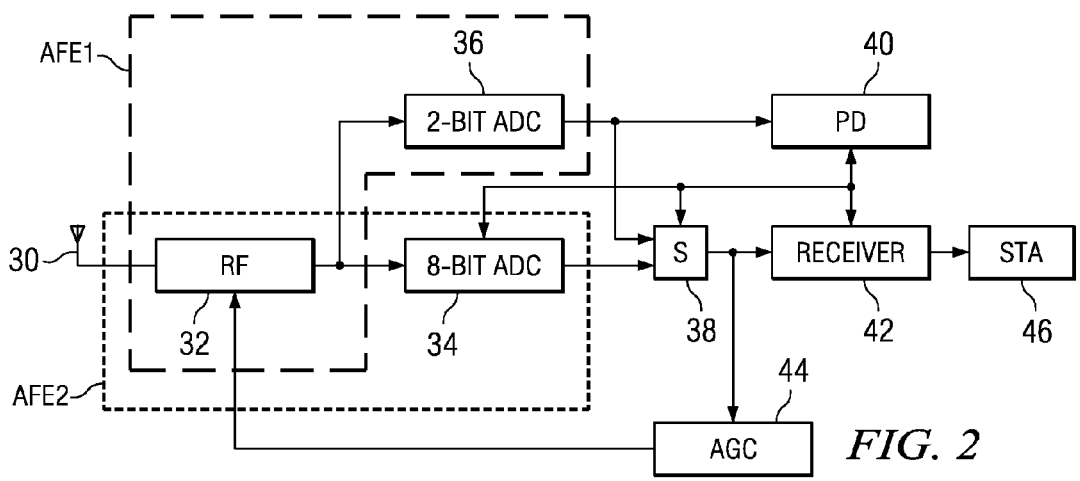
FIG. 2 illustrates an embodiment of a receiver in a wireless communication system in accordance with an embodiment of the invention; and, FIG. 3 shows an embodiment of a method for receiving data in a wireless communication system using a low-power listening mode.

In FIG. 2, an embodiment of a WLAN receiver system according to the present invention is illustrated. The spread spectrum barker code does not require that the received RF signals be processed by a high resolution ADC. A low resolution ADC having only two or three bits of resolution has been found to provide a signal which allows a packet detector, e.g. 40, to detect the barker code with essentially no reduction in detection accuracy. A low resolution ADC uses considerably less power than a high resolution ADC. Typical stations actually receive incoming data packets for only a small percentage of the time. The stations spend the majority of the time listening for incoming data packets. This embodiment includes an antenna 30 and RF section 32. The RF section 32 output is coupled to both an eight-bit ADC 34 and a two-bit ADC 36. Outputs of both ADC 34 and ADC 36 are coupled to a switch 38. The output of the two-bit ADC 36 is also coupled to a packet detector 40. The output of switch 38 is coupled to a receiver 42 and to an AGC 44. The output of receiver 42 is coupled to a station 46, e.g. a computer. The packet detector 40 has an output coupled to the eight-bit ADC 34, the switch 38 and the receiver 42.

The FIG. 2 embodiment has two different operating configurations. In the listen mode of operation, the eight-bit ADC 34 is not enabled and the switch 38 couples the output of the two-bit ADC 36 to the AGC 44 and the receiver 42. The output of the two-bit ADC 36 is always coupled to the input of the packet detector 40. In the listen mode, the packet detector 40 continuously monitors incoming signals looking for the barker code which indicates that a data packet is being sent to the station 46. As noted above, the packet detector 40 functions as well with a signal from a two-bit ADC 36 as it would with a signal from a high resolution ADC such as ADC 34. However, the two bit ADC 36 uses considerably less power than the eight-bit ADC 34 does when it is enabled, i.e. powered up.

When the packet detector 40 detects an appropriate barker code, it changes the system of FIG. 2 into a receive mode. The output of packet detector 40 enables, i.e. turns power on for, the eight bit ADC 34 and changes the position of switch 38 so that the output of ADC 34 is coupled to the AGC 44 and the receiver 42. The output of packet detector 40 is also used to notify receiver 42 that data is being received and provides appropriate timing information. In receive mode, the eight bit ADC 34 provides high resolution signals as needed for the receiver 42. When the data packet has been received, the system switches back to the low power listen mode of operation. The packet header includes a field indicating the length of the packet. The receiver can therefore determine when the entire packet has been received and provide a signal back to the packet detector 40 to reset the system to the listen mode.

Figure 3:
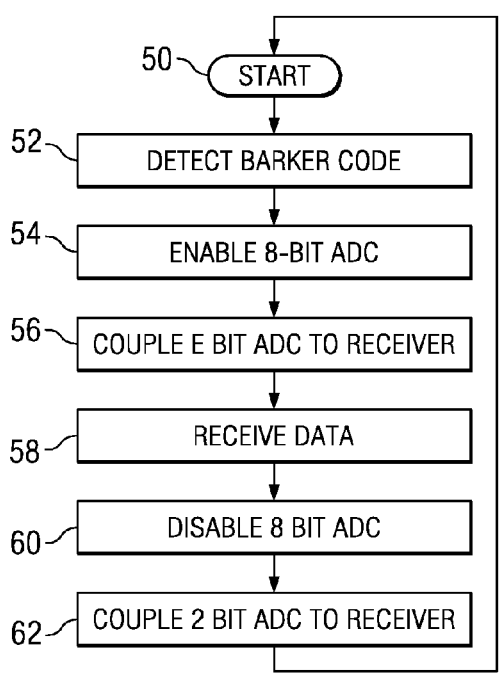

FIG. 3 provides a flow chart illustration of a method of using the system shown in FIG. 2. Step 50 is labeled "start" and may occur on powering up a station 46, on restarting the system or, as described below, after a data packet has been received. At step 50, the system is placed into the listen mode with the eight bit ADC 34 disabled and the switch 38 coupling the output of the two bit ADC 36 to the receiver 42 and the AGC 44. At step 52 the system monitors received RF signals and detects a barker code indicating that a data packet has been sent to the station 46. After detecting the barker code, the eight bit ADC 34 is enabled, i.e. powered up, at step 54. At step 56, the position of switch 38 is changed to couple the output of the eight bit ADC 34 to the receiver 42. The steps 54 and 56 may occur in parallel or simultaneously and place the system into receive mode. At step 58, the receiver receives the data packet and couples it to the station 46. After the data packet has been received, at step 60 the eight bit ADC 34 is disabled and, at step 62, the position of switch 38 is changed to couple the output of the two bit ADC 36 to the receiver 42 and the AGC 44. Steps 60 and 62 may occur in parallel or simultaneously and place the system back into listen mode. The method then returns to the start position, step 50. While steps 60 and 62 are illustrated as separate steps occurring before return to the start step 50, they may simply be part of the start step 50, which includes placing the system into listen mode.

As noted above, power is saved in listen mode by disabling or deactivating the eight bit ADC 34 during listen mode. This may be done by simply switching off the power to the eight bit ADC 34. The ADC 34 may be enabled by switching the power back on. If desired, the power to the two bit ADC 36 may be switched off when the eight bit ADC 34 is enabled. This is not done in the illustrated embodiment because the two bit ADC 36 uses very little power and the receive mode occurs only a small percentage of the time. Little power would be saved by switching off the two bit ADC 36 during receive mode. Significant power saving is achieved by turning off the eight bit ADC during the listen mode, which occurs a large percentage of the time. The power savings increases the time a station may operate on battery power before the batteries must be replaced or recharged.

The embodiment shown in FIG. 2 includes a two-bit ADC 36 as a low resolution ADC and an eight bit ADC 34 as a high resolution ADC. The exact number of bits of resolution may vary depending on other system requirements. For example, some receivers work better if a nine bit or ten bit ADC is used and some may work properly with a seven bit ADC. Any of such ADCs are considered high resolution compared to the low resolution two or three bit ADCs which have been found to provide accurate inputs for a packet detector 40 in a WLAN.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless receiver having a low-power listen mode, comprising:
    a first receiver path having a low resolution analog-to-digital converter for decoding a preamble to a wireless data packet and a second receiver path having a high resolution analog-to-digital converter for decoding a data packet payload, a packet detection logic to identify data packets directed to the wireless receiver; and
    a switching logic coupled to the packet detection logic to select the first receiver path or the second receiver path depending on whether the packet detection logic has identified a data packet directed to the wireless receiver, wherein the first receiver path has a lower decoding resolution than the second receiver path.

2. The wireless receiver of claim 1 wherein the second receiver path is separated from the first receiver path.

3. The wireless receiver of claim 1 wherein the first receiver path requires less power to operate than the second receiver path.

4. The wireless receiver of claim 1 wherein the low resolution analog-to-digital converter is a 2-bit analog-to-digital converter.

5. The wireless receiver of claim 1 wherein the high resolution analog-to-digital converter is an 8-bit analog-to-digital converter.

6. The wireless receiver of claim 1 wherein the first receiver path uses barker-code detection to decode the preamble.

7. The wireless receiver of claim 6 wherein the switching logic selects the first receiver path until the data packet is identified and then selects the second receiver path to decode the data packet payload.

8. A wireless receiver having a low-power listen mode, comprising:
    a first analog front end comprising a low resolution analog-to-digital converter for receiving and decoding a preamble to a wireless data packet and a second analog front end comprising a high resolution analog-to-digital converter for receiving and decoding a data packet payload;
    a packet detection logic to identify whether the wireless data packet is directed to the wireless receiver; and
    a switching logic coupled to the packet detection logic to select the first analog front end or the second analog front end depending on whether the packet detection logic has identified the data packet as being directed to the wireless receiver, wherein the first analog front end receives and decodes the preamble and the second analog front end receives and decodes the data packet payload, wherein the first analog front end has a lower decoding resolution than the second analog front end.

9. The wireless receiver of claim 8 wherein the first analog front end requires less power to operate than the second analog front end.

10. The wireless receiver of claim 8 wherein the low resolution analog-to-digital converter is a 2-bit analog-to-digital converter.

11. The wireless receiver of claim 8 wherein the high resolution analog-to-digital converter is an 8-bit analog-to-digital converter.

12. The wireless receiver of claim 8 wherein a first receiver path, coupled to the first analog front end, uses barker-code detection to decode the preamble.

13. The wireless receiver of claim 8 wherein the switching logic selects the first analog front end until the data packet is identified as being directed to the wireless receiver and then selects the second analog front end to receive the data packet payload.

14. A method for receiving data packets in a wireless receiver, comprising:
    receiving radio frequency signals with a first receiver path comprising a low resolution analog-to-digital converter;
    decoding signals received through the first receiver path to detect a code in a preamble of a received data packet;
    upon detection of the code, switching to a second receiver path;
    receiving a payload of the received data packet with the second receiver path comprising a high resolution analog-to-digital converter, wherein the first receiver path has a lower decoding resolution than the second receiver path; and
    decoding the payload received through the second receiver path using the decoding resolution of the second receiver path.

15. The method of claim 14 further comprising switching back to the first receiver path when receiving of the payload is completed.

16. The method of claim 14 wherein the first receiver path requires less power than the second receiver path.

17. A wireless device that is adapted to receive data packets from another wireless device, comprising:
    receiving means for receiving encoded information via a data packet, the receiving means comprising
    a first decoding means comprising a low resolution analog-to-digital converter for decoding a preamble of the data packet, the receiving means further comprising a second decoding means comprising a high resolution analog-to-digital converter for decoding a payload of the data packet, and switching means for switching between the first and second decoding means, wherein the first decoding means has a lower decoding resolution than the second decoding means.

* * * * *